S. MOULTON.
Car Spring.
No. 2,593, 33,597.
Patented Oct. 29, 1861.
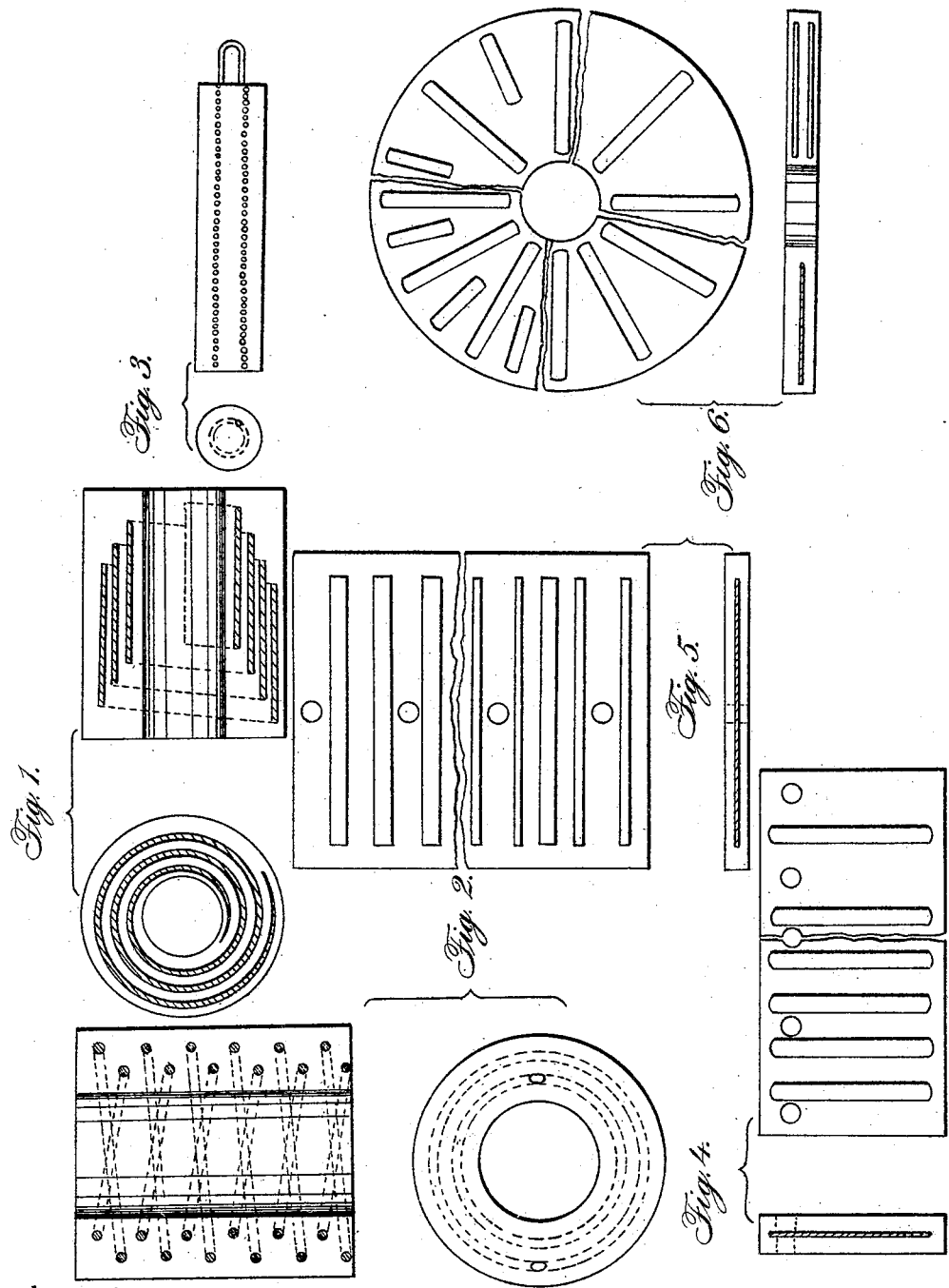

UNITED STATES PATENT OFFICE.

STEPHEN MOULTON, OF BRADFORD, ENGLAND.

IMPROVEMENT IN THE MANUFACTURE OF SPRINGS FROM RUBBER AND STEEL.

Specification forming part of Letters Patent No. 33,597, dated October 29, 1861.

*To all whom it may concern:*

Be it known that I, STEPHEN MOULTON, of Bradford, in the county of Wilts, England, india-rubber manufacturer, a subject of the Queen of Great Britain, have invented or discovered new and useful Improvements in the Manufacture of India-Rubber Applicable to Springs, Valves for Machinery, and other Purposes; and I, the said STEPHEN MOULTON, do hereby declare the nature of the said invention and in what manner the same is to be performed to be particularly described and ascertained in and by the following statement thereof—that is to say:

This invention has for its object improvements in the manufacture of india-rubber applicable to springs for railway-engines, carriages, buffer-springs, and other purposes where elasticity is required, and likewise to valves of various sorts required in steam-engines, pumps, and other machinery or apparatus; and my improvements consist in the embedding of spiral or other suitably-shaped springs of steel or other suitable metal into the mass of the india-rubber during its formation into the required shape and before its being "cured," and after its being so embedded by being molded with the springs while in a soft state it is subjected to the process of "curing," as is well understood by india-rubber manufacturers. For making india-rubber valves strips or plates or wire or other forms of steel or other suitable metal are embedded spirally or radially or longitudinally or in other desired forms, according to the shape it is intended to make the valve, and in one or more thicknesses, in the mass of the india-rubber during the process of molding to the desired shape, such strips, plates, wires, or other shaped metal being placed in the center of the thickness of the valve or toward one side or the other, according to the degree of elasticity required to be given. The strips, plates, or other forms of metal being thus fixed in the mass of the india-rubber, the whole is subjected to the process of curing, as above alluded to.

In order that my invention may be most fully understood and readily carried into practice, I will proceed to describe the drawings hereunto annexed.

In the drawings, Figure 1 shows a side view in section and a plan in section of a spring composed of india-rubber and having a piece of steel or other metal in the form of a volute spiral embedded therein manufactured according to my invention (or more than one such spiral may be used, if desired) and suitable for being used as a buffer-spring for railway engines or carriages or for bearing-springs for the same and for other purposes, such bearing-springs being likewise similarly formed. Fig. 2 shows a similar plan and section of like springs having spiral wires embedded therein. Fig. 3 shows a longitudinal and transverse section of a common helical spring embedded in india-rubber according to my invention. Fig. 4 shows a plan and section of a single-flap valve; and Fig. 5, similar views of a double-flap valve manufactured with india-rubber, having strips or plates of steel or other metal embedded therein in any desired position. Fig. 6 shows similar views of a circular valve made of india-rubber embedded with steel or other metal in the process of manufacture and having the strips placed radially and in such quantities or number as may be desired, or the plate or plates may be made of a flat spiral or spirals as required and molded in combination therewith according to my invention.

The manufacture of india-rubber (caoutchouc) by different processes so as to mold the same into articles of various forms for a variety of purposes, together with the process of curing or changing the character of the india-rubber by treating or compounding it with sulphur or with sulphur chemically combined with other substances, being now generally well understood, it will not be necessary for me to enter into any description thereof further than to state that the processes employed for the preparation, manufacture, and treatment of india-rubber, (caoutchouc,) combined with other materials and fully described in the specification of a patent granted to W. E. Newton, dated January 30, 1844, No. 10,027, and in the specification of a patent granted to myself, dated February 8, 1847, No. 11,567, are very suitable for the purpose of carrying out my present improvements, which consist in embedding steel or other metal of suitable forms and in molding the same with the india-rubber manufactured as described in those specifications or by other similar processes, the india-rubber being afterward cured or rendered permanently elastic by heat or otherwise, as is will understood, so as to act as a spring in combination with the spiral, helical, flat, or other shaped metal surfaces embedded therein.

When spiral or other shaped springs are embedded in the india-rubber according to my invention, I prefer to temper the same in the usual manner before being embedded, the heat to which the india-rubber is subjected in the curing process being too low to affect the temper of the springs so embedded.

Having thus described the nature of my invention, I would have it understood that I do not confine myself to the exact details herein described; nor do I claim, generally, the molding or embedding of metal surfaces with india-rubber in the process of manufacture, the same having been practiced for other purposes; neither do I claim the combination of india-rubber and steel to form springs when the steel is not embedded and entirely inclosed within the india-rubber; but

What I claim is—

The manufacture of india-rubber springs having steel or other metal surfaces embedded therein to form springs and valves of various kinds, as herein described.

STEPH. MOULTON.

Witnesses:
GEORGE H. BIRKBETH,
34 *Southampton Buildings, London.*
JOHN TINDALE,
2 *George Yard, Lombard St., London.*